US007357163B2

(12) United States Patent
Wager

(10) Patent No.: US 7,357,163 B2
(45) Date of Patent: Apr. 15, 2008

(54) DIGGING OR GRIPPING TOOL

(75) Inventor: Bernd Wager, Kirchdorf/Iller (DE)

(73) Assignee: Liebherr- Hydraulikbagger GmbH, Kirchdorf/Iller (DE)

(*) Notice: Subject to any disclaimer, the term of this patent is extended or adjusted under 35 U.S.C. 154(b) by 0 days.

(21) Appl. No.: 11/219,176

(22) Filed: Sep. 2, 2005

(65) Prior Publication Data

US 2006/0048851 A1 Mar. 9, 2006

(30) Foreign Application Priority Data

Sep. 6, 2004 (DE) .................. 20 2004 013 842 U

(51) Int. Cl.
*A01G 23/08* (2006.01)

(52) U.S. Cl. .................... 144/4.1; 144/34.1; 144/24.12

(58) Field of Classification Search ................ 414/729, 414/739; 37/340, 341, 444, 406; 294/902; 144/335, 336, 339, 4.1, 34.1, 34.5, 24.12, 144/3.1, 34.4, 2.1

See application file for complete search history.

(56) References Cited

U.S. PATENT DOCUMENTS 3,301,587 A 1/1967 Heikkinen
3,393,014 A 7/1968 Ascher, Jr.
3,881,533 A * 5/1975 Savage et al. ............... 144/4.1
4,475,602 A 10/1984 Gerstner
4,830,177 A * 5/1989 Baba et al. ................. 198/509
4,852,277 A * 8/1989 Ward ........................... 37/403
4,860,884 A * 8/1989 Kostrewa .................... 198/509

FOREIGN PATENT DOCUMENTS

| | | | |
|---|---|---|---|
| CA | 2 280 624 | A1 | 4/2000 |
| CH | 686 952 | A | 8/1996 |
| DE | 620 025 | C | 10/1935 |
| DE | 19 92 979 | U | 8/1968 |
| DE | 23 00 689 | A1 | 7/1974 |
| JP | 03125030 | A * | 5/1991 |
| JP | 04293707 | A * | 10/1992 |
| SU | 592 738 | A1 | 2/1978 |

OTHER PUBLICATIONS

European Search Report, Jan. 30, 2006.

* cited by examiner

*Primary Examiner*—Bena Miller
(74) *Attorney, Agent, or Firm*—Carter, DeLuca, Farrell & Schmidt, LLP

(57) ABSTRACT

This invention relates to a digging or gripping tool with at least one cutting edge, wherein rollers are disposed along the outer edge of the cutting edge in accordance with the invention.

9 Claims, 2 Drawing Sheets

DIGGING OR GRIPPING TOOL

Figure 1:
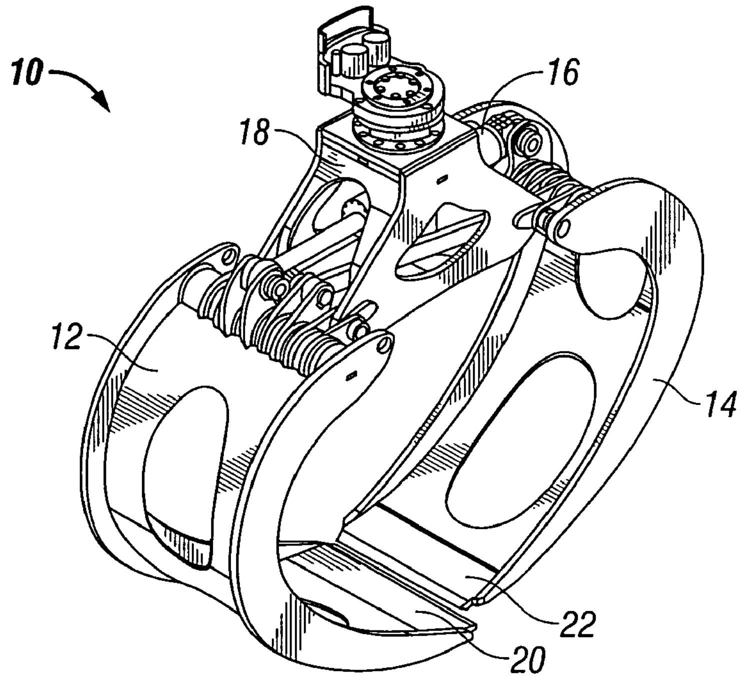
FIG. 1 (Prior Art)

This invention relates to a digging or gripping tool with at least one cutting edge.

Digging or gripping tools are frequently used in excavators, for instance as clamshell grabs. They are also used in other fields, for instance as timber tongs for timber trucks. When working on paved ground, for instance asphalt or concrete, the cutting edges of digging and gripping tools are subject to constant wear and tear. After a certain operating period, the cutting edges are therefore sharpened. In accordance with the prior art, the cutting edges are made of a high-strength and wear-resistant material. They are welded into the region of the outer edge of the digging or gripping tool. If the cutting edges are worn during usage, they are removed and replaced by new ones.

In certain applications, such as loading stem wood by means of timber tongs, the cutting edges sharpened as a result of wear and tear lead to great problems. When the open timber tongs penetrate into the stacked stems it can occur that the stems are split and thus damaged without this being noticed by the operator. The damaged wood undergoes the production process in the timber mill unnoticed. Such damage of the cut timber is often only noticed by the ultimate customer.

It is the object of the present invention to create a digging or gripping tool, in which the undesired sharpening of the cutting edges during usage is largely prevented.

In accordance with the invention, this object is solved by the combination of features of claim 1. Accordingly, rollers are disposed along the outer edge of the cutting edges of a digging or gripping tool. When the digging or gripping tool is closed, the otherwise abrasive wear of the cutting edge is prevented by these rollers as a result of the rolling movement of the rolling elements on the ground. The invention utilizes the knowledge that a rolling wear is distinctly smaller than an abrasive wear. The rollers on the whole have a larger volume of wear. Thus, a wear system is created here, which involves distinctly longer regeneration intervals. The regeneration, i.e. the preparation of the cutting edge after a corresponding wear, is simplified considerably, as it is not necessary to burn off the entire cutting edge and replace the same by welding in a new cutting edge, but because here merely the rollers must be exchanged. In addition, the ground is spared when working with the digging or gripping tool. When using the inventive solution for logging tongs, advantageously less timber is damaged, so that the quality assurance in the production process in a timber mill can be improved. In other fields of use, a more careful gripping is possible.

Preferred aspects of the invention can be taken from the sub-claims adjoining the main claim.

Accordingly, at the outer edge of the cutting edge vertical webs can be provided, between which the rollers are mounted.

The webs or bearing surface between the rollers preferably are made such that the projection of the bearing surface towards the rollers is designed such that for instance when using timber tongs, an individual stem nevertheless can safely be picked up.

Figure 2A:
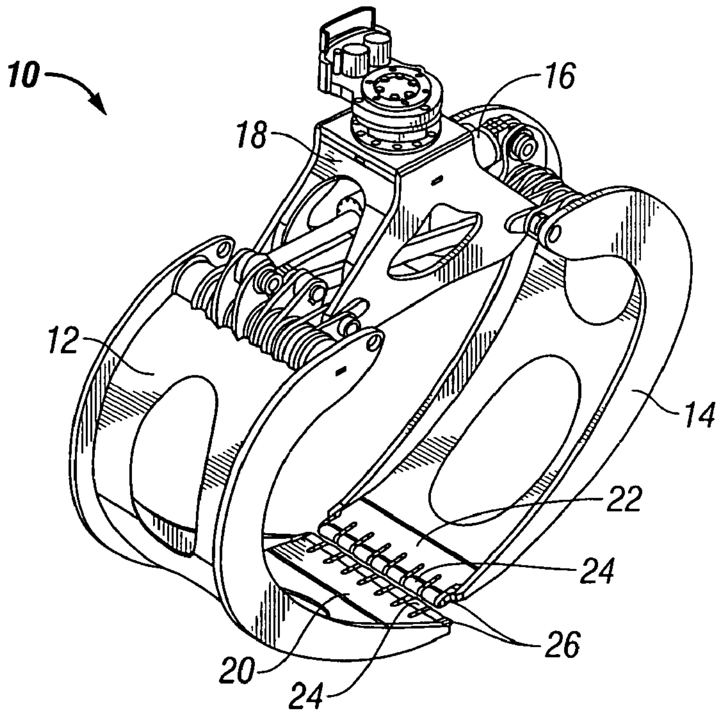
Figure 2B:
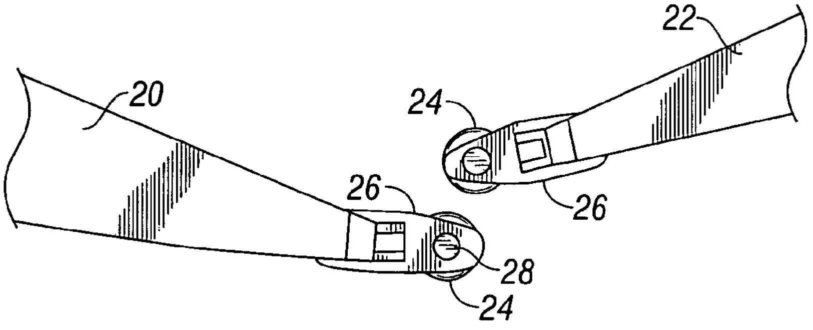
Figure 2C:
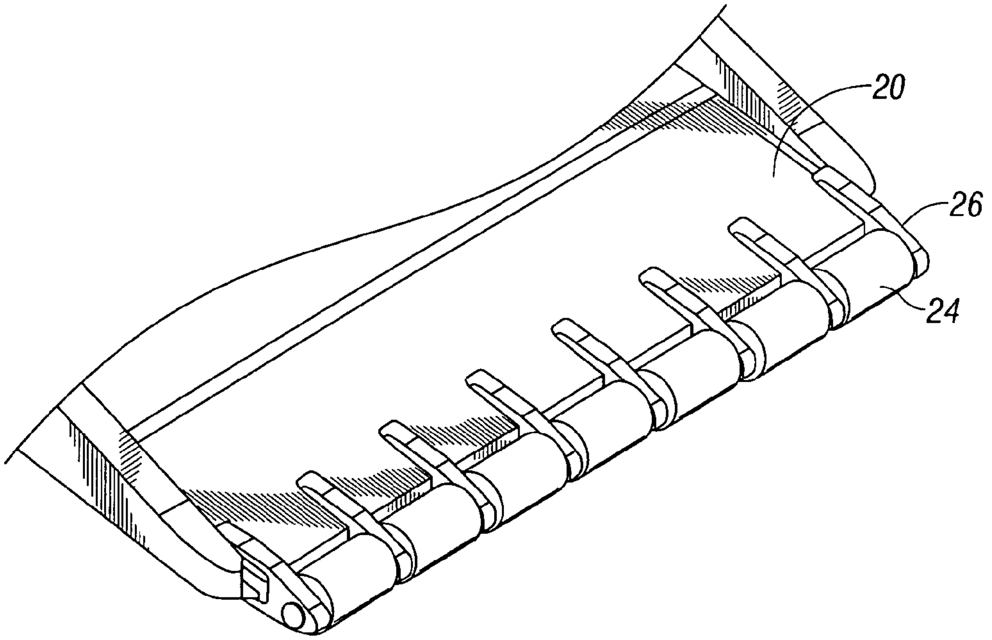

Further features, details and advantages of the invention will be explained in detail with reference to an embodiment shown in the drawing, in which:

FIG. 1 shows a clamshell grab with conventional cutting edges according to the prior art; and FIG. 2A shows a clamshell grab according to an embodiment of the present invention, FIG. 2B shows a side view of the region of the cutting edge of the clamshell grab shown in FIG. 2A, and FIG. 2C shows an enlarged perspective view of a cutting edge shown in FIG. 2B.

FIG. 1 shows a clamshell grab 10 in accordance with the prior art, the shells 12 and 14 being pivotally mounted in opposite directions about a supporting piece 18 by means of a piston-cylinder unit 16. In the illustrated embodiment, the clamshell grab constitutes so-called timber tongs for gripping for instance stacked stems. In its outer edge region, the clamshell grab includes cutting edges 20 and 22, which are made of a hardened material, for instance hardened steel. The cutting edges are welded at the corresponding points of the shells 12 and 14, respectively. After a corresponding wear, they must be burnt off and be replaced by cutting edges to be newly welded.

FIGS. 2A, 2B and 2C show an embodiment of a digging or gripping tool in accordance with the invention, which here is likewise designated with 10. It substantially has the same structure as the clamshell grab of FIG. 1. However, the cutting edges 20 and 22 are modified here. In the front region of the cutting edge, they include roller elements 24 disposed in series one beside the other, which are rotatably mounted between webs 26 vertically protruding from the cutting edge 20, 22, as can in particular also be taken from FIGS. 2B and 2C. As shown in FIG. 2B, the rollers 24 of the cutting edge 20 are rolling on the ground, whereas the rollers of the cutting edge 24 lie above the rollers 24 of the cutting edge 20 during closure of the clamshell grab 10.

The rollers 24 are rotatably mounted on shafts 28, which are defined by the webs. By withdrawing the shafts 28, the rollers can easily be removed and be replaced by new rollers 24.

The invention claimed is:

1. A digging or gripping tool comprising at least one cutting edge, wherein the cutting edge has an outer edge, the outer edge having a plurality of adjacently disposed cutting edge rollers mounted thereon, wherein a plurality of vertical webs are disposed on the outer edge of the cutting edge, between which the rollers are mounted, wherein each adjacent roller shares at least one of the webs, the webs and rollers defining a substantially continuous assembly, the individual rollers being adapted to independently rotate on contact with an opposing surface.

2. The digging or gripping tool as claimed in claim 1, wherein the digging or gripping tool comprises a clamshell grab having opposed cutting edges, at least one of said opposed cutting edges having said cutting edge rollers mounted thereon.

3. The digging or gripping tool as claimed in claim 2 wherein each respective opposed cutting edges have said cutting edge rollers mounted thereon.

4. The digging or gripping tool as claimed in claim 1, wherein the digging or gripping tool comprises timber tongs, having opposed cutting edges, at least one of said opposed cutting edges having said cutting edge rollers mounted thereon.

5. The digging or gripping tool as claimed in claim 4 wherein each respective opposed cutting edges have said cutting edge rollers mounted thereon.

6. The digging or gripping tool as claimed in claim 1, wherein the at least one cutting edge is welded onto a foundation of the digging or gripping tool.

7. The digging or gripping tool as claimed in claim 1, wherein the cutting edge extends along a length having a first end and a second end, wherein the plurality of vertical webs includes at least first, second, and third vertical webs and the plurality of adjacently disposed cutting edge rollers includes at least first and second cutting edge rollers, wherein the first vertical web is mounted between the first end and second end, the first cutting edge roller being mounted between the first vertical web and the second vertical web, the second cutting edge roller being mounted between the second vertical web and the third vertical web, thus forming a series of adjacently mounted rollers.

8. The digging or gripping tool as claimed in claim 7, wherein the first vertical web is mounted proximate to the first end and additional series of adjacently mounted rollers are mounted between the first end and the second end, wherein the series of adjacently mounted rollers extends from the first end to the second end.

9. A digging or gripping tool comprising at least two opposing cutting edges pivotally mounted with respect to one another and movable between a first open position wherein said cutting edges are spaced from one another and a closed position wherein said cutting edges are disposed in juxtaposed alignment, at least one of said cutting edges having a plurality of adjacently disposed cutting edge rollers mounted thereon, wherein a plurality of vertical webs are disposed on the outer edge of the cutting edge, between which the rollers are mounted, the individual rollers being adapted to independently rotate.

* * * * *